United States Patent Office 3,573,267
Patented Mar. 30, 1971

3,573,267
POLYMERIC PRODUCTS AND PROCESSES
Joseph Green, 3 New Dover Drive, North Brunswick, N.J. 08902, and Joseph A. Castellano, 968 Shepard Ave., East Brunswick, N.J. 08816
No Drawing. Continuation-in-part of application Ser. No. 514,401, Dec. 16, 1965. This application July 24, 1968, Ser. No. 747,092
Int. Cl. C08f 3/22, 3/32, 15/06
U.S. Cl. 260—92.1   6 Claims

ABSTRACT OF THE DISCLOSURE

Cured nitroso rubbers are provided by curing terpolymers of mixtures of three fluorinated monomers including 4-bromo-2,3,5,6-tetrafluoronitrosobenzene or 4-carboxy-2,3,5,6-tetrafluoronitrosobenzene.

---

This application is a continuation-in-part of Ser. No. 514,401 filed Dec. 16, 1965, now U.S. Pat. No. 3,438,672.

This invention relates to novel fluorine containing aryl monomers and to a process for preparing, polymerizing and curing them.

More particularly, this invention concerns the preparation of aromatic polyfluoronitroso compounds. The compounds are useful as monomers for co- and terpolymerization. The novel compositions of this invention are included within the structures:

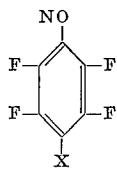

wherein X is selected from the group consisting of aliphatic, chlorine, bromine, iodine, haloalkyl, acetyl, trihaloacetyl, and 4-polyhalo-2,3,5,6-tetrafluoroanilines.

Nitroso rubbers are highly valued for certain commercial and military applications because of an unusual combination of properties. They have good resistance to chemical attack and have excellent retention of their elastomeric properties at extremely low (about −50° C.) temperatures.

Pentafluoronitrosobenzene is disclosed by Brooke et al. in Chem. and Ind., 1961, 832. Unfortunately this composition, which potentially could be a valuable intermediate for the preparation of nitroso polymers, has been found to lack utility. The reason for this is that the perfluoro compound cannot be crosslinked using the known curing agents and curing techniques. The para-fluorine group is highly labile in the monomer pentafluoronitrosobenzene but becomes unusually inert when present in the polymer. The reason for this is apparently the change in the inductive factor when the para —N=O of the monomer goes to the

bonding of the polymer. Surprisingly, the replacement of the para-fluorine with certain more reactive groups gives rise to a novel series of nitroso compounds which can be readily cured using the curing agents and methods of the prior art. That the mere substitution of the parafluorine atom with other groups would convert an unusable polymer intermediate to a valuable polymer intermediate was unexpected and could not have been foreseen.

Thus it is an object of this invention, among others, to prepare novel tetrafluoronitrosobenzenes heretofore unreported in the prior art.

Another object of this invention is the preparation of novel nitroso polymers.

A further object of this invention is to prepare valuable nitroso polymer intermediates.

An additional object of this invention is to disclose a novel process for converting tetrafluoroaminobenzenes to their corresponding nitroso derivatives.

Additional objects will become apparent to those skilled in the art after a further perusual of this invention.

The above objects, among others, are achieved by the preparation of the novel compounds of this invention by the process described more fully below.

In practice, performic acid is allowed to react with 4-substituted-2,3,5,6-tetrafluoroanilines to convert the amino group in the 1 position to the nitroso (NO) group. The resultant products can be isolated by a number of techniques, including filtration after dilution with water, solvent extraction, evaporation and the like. Further purification can be effected by recrystallization, chromotrography, or other techniques used by those skilled in the art to purify comparable organic compounds.

In the preferred practice a 4-substituted-2,3,5,6-tetrafluoroaniline of the formula:

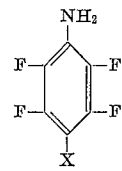

wherein X is selected from the group consisting of chloro, bromo, ido, methyl, trifluoromethyl, ethyl, propyl, acetyl, trifluoroacetyl, carboxy, tetrafluorosuccinoyl, hexafluoroglutaroyl and 2,3,5,6-tetrafluoroaniline, is contacted with a performic acid, or performic acid prepared in situ by the reaction of concentrated formic acid and concentrated hydrogen peroxide, usually in the presence of a suitable inert solvent such as methylene chloride or ethylene chloride. The reaction mixture is brought to reflux and kept at this temperature until the nitroso compound is formed. The reaction mixture, which is usually dark green, is treated with water and the water-organic phase mixture heated to remove water-soluble impurities. The deep green organic phase is then separated, washed, dried, and the solvent stripped off to leave a residue of product. A more highly purified final product can be obtained by chromatography, recrystallization, solvent extraction or a combination of one or more purification steps. Structure can be confirmed by elemental analysis and I.R. spectra analysis.

The ratio of the reactants is not critical, the main requirement being that sufficient "performic" acid is present to assure that all of the 4-(para) substituted 2,3,5,6-tetrafluoroaniline is converted into the desired nitroso derivative. While nitroso product will still be obtained when less than a stoichiometric amount of performic acid is used, a product contaminated with starting material is obtained. For this reason an excess of performic acid above that required by stoichiometry is preferred.

While performic acid is the preferred oxidizer to convert the 4-substituted fluoroanilines to the corresponding nitroso product, other oxidizers can be used. These include peracetic acid, persulfuric acid, peroxy carboxylic acids, and the like.

The reaction time required to prepare the nitroso derivative from the aniline precursor usually varies between 2–8 hours at reflux temperatures of the methylene choride reaction mixtures. However, the use of other higher boiling inert solvents can probably result in shorter reaction times. Longer reaction times at the preferred reflux temperatures are not harmful. However, care must be taken not to make the reaction go to the fully oxidized state, i.e., to the formation of nitro compounds.

Some flexibility in regard to reaction temperature exists. Preferably the oxidation is carried out at the reflux temperature of methylene chloride.

The starting materials for preparing the 4-substituted-2,3,5,6-tetrafluoroaniline starting materials are in some instances novel compositions as far as can be determined. The 4-bromo-2,3,5,6-tetrafluoroaniline, which is a known compound, is prepared by the bromination of the 2,3,5,6-tetrafluoroaniline. The 4-amino-2,3,5,6-tetrafluorobenzoic acid is also a known compound.

To show the working of this invention in detail, the following embodiments are submitted.

In one embodiment of this invention 4-amino-2,3,5,6-tetrafluorobenzoic acid is prepared as follows.

In the first reaction 4-amino-2,3,5,6-tetrafluorobenzoic acid is prepared by refluxing a reaction mixture of 50 parts by weight 4-amino-2,3,5,6-tetrafluorobenzamide and 250 parts by weight of 20% aqueous sodium hydroxide for 10 hours. The resulting solution is acidified with concentrated hydrochloric acid and the precipitated acid product collected by filtration. After recrystallization from acetone, a product consisting of 32 parts by weight of colorless crystals, M.P.: 170–172° C., is obtained. A second recrystallization from $CCl_4$ gives a product which melts at 176–177° C. and which has a mol. wt. of 208 (calcd. 209) and a $pK_a$ of 3.65. Infrared spectrum analysis and elemental analysis (the latter being given below) confirm that 4-amino-2,3,5,6-tetrafluorobenzoic acid is produced.

Analysis.—Calcd. for $C_7F_4H_3NO_2$ (percent): C, 40.21; H, 1.45; N, 6.70. Found (percent): C, 39.66; H, 1.77; N, 6.73.

A mixture of 5 g. of 4-amino-2,3,5,6-tetrafluorobenzoic acid prepared above and 250 ml. of methylene chloride is contacted with a previously prepared solution of 40 ml. of 98% formic acid and 10 ml. of 90% hydrogen peroxide and refluxed for 5 to 6 hours. After the addition of 200 parts by weight of water the mixture is refluxed for 1 hour. The blue-green organic solution is separated, dried over anhydrous sodium sulfate and evaporated to dryness to yield a pale yellow solid having a M.P.: 224–226° C. (dec.) and molecular weight of 225 (calcd. 223). Elemental analysis (given below) and I.R. analysis confirm that the desired 4-nitroso-2,3,5,6-tetrafluorobenzoic acid is obtained.

Analysis.—Calcd. for $C_7H_4NO_3$ (percent): C, 37.69; H, 0.45; N, 6.28. Found (percent): C, 38.17; H, 0.63; N, 5.88.

In another embodiment 4-bromo-2,3,5,6-tetrafluoroaniline prepared by brominating 2,3,5,6-tetrafluoroaniline in glacial acetic acid is converted to 4-bromo-2,3,5,6-tetrafluoronitrosobenzene dimer as follows.

A mixture of 4-bromo-2,3,5,6-tetrafluoroaniline (15 parts by weight), 120 ml. of 98% formic acid, and 30 ml. of 90% hydrogen peroxide is stirred for 15 minutes at room temperature with 400 ml. of methylene chloride. The reaction mixture is refluxed for 5 hours, forming a deep green mixture. The mixture is treated with 250 parts by weight of water and refluxed for 30 minutes. The deep green organic phase is separated, washed with water and dried over anhydrous sodium sulfate. The solvent is removed in vacuo and the residue taken up in pentane. The solution is chromatographed on acid-washed alumina and eluted with pentane. The blue-green element is collected and evaporated to dryness to yield 10.2 parts by weight of a pale yellow solid which melts at 36–37° C. to a blue-green liquid. Recrystallization of the material from ethanol produced colorless crystals, M.P.: 39–40° C. (corr.), of 4-bromo-2,3,5,6-tetrafluoronitrosobenzene dimer.

Analysis.—Calcd. for $C_6F_4BrNO$ (percent): C, 27.93; Br, 30.98; N, 5.43. Found (percent): C, 28.15; Br, 31.00; N, 5.29.

The infrared spectrum of the blue-green liquid exhibited strong sharp absorptions at 1530, 1510, 1480, and 1360 cm.$^{-1}$.

In a related embodiment the corresponding 4-iodo-2,3,5,6-tetrafluoronitrosobenzene is prepared in two steps. In the first operation the above 4-bromo-2,3,5,6-tetrafluoroaniline (5 parts by weight) is treated with a stoichiometric excess of iodine in carbon tetrachloride in the presence of oxidizing agent. The 4-iodo derivative is treated with a stoichiometric excess of performic acid until the above 4 - iodo - 2,3,5,6 - tetrafluoronitrosobenzene product is formed.

In another related embodiment 4-bromo-2,3,5,6-tetrafluoroaniline (5 parts by weight) is treated with a stoichiometric excess of carbon tetrachloride saturated with chlorine until the 4-chloro-2,3,5,6-tetrafluoroaniline is formed. The chloro intermediate is contacted with a stoichiometric excess of performic acid until the product 4-chloro-2,3,5,6-tetrafluoronitrosobenzene is formed.

To indicate the utility of some of the inventive compositions as nitroso rubber intermediates, the following examples are submitted.

EXAMPLE 1

Preparation and curing of nitroso rubber using 4-nitroso-2,3,5,6-tetrafluorobenzoic acid A 7 ml. Carius tube was charged with 0.22 g. (0.0010 mole) of freshly prepared 4-nitroso-2,3,5,6-tetrafluorobenzoic acid dimer. The tube was evacuated and 0.89 g. (0.0090 mole) of trifluoronitrosomethane and 1.00 g. (0.010 mole) of tetrafluoroethylene were condensed in at −196° C. from a calibrated vacuum system. After the tube was sealed under vacuum, it was shaken at −25° C. for 24 hours. The tube was allowed to warm to room temperature the resultant polymer plug was washed several times with acetone to remove unreacted monomer and dried overnight in a vacuum oven at 50°. A yield of 1.7 g. (80.5%) of a tan gum was obtained. A strong absorption at 1530 cm.$^{-1}$ (ring breathing mode) in the infrared spectrum of the product indicated the presence of the aromatic ring in the polymer.

The above polymer is cured as follows:

The rubber (100 parts) is blended with 20 parts of silica filler and 5 parts of chromium trifluoroacetate on a two roll mill. It is then mold curved for 60 minutes at 200° F. and post cured in an oven in steps of 120 minutes at 200° F.; 120 minutes at 225° F.; 60 minutes at 250° F.; and 60 minutes at 300° F. to yield a resilient vulcanizate having high tensile strength.

In a similar fashion terpolymers containing pentafluoronitrosobenzene and 4-bromo - 2,3,5,6 - tetrafluoronitrosobenzene have been prepared. The latter was cured with metal oxides and metal salts to give strong, resilient vulcanizates indicating the labile nature of the bromine group. By contrast the pentafluoronitrosobenzene terpolymer could not be cured, as the para-fluorine group was not sufficient reactive. This change in converting a heretofore uncurable polymer to a useful and curable nitroso rubber by changing a fluoro group to a bromo group could not have been predicted.

As indicated earlier, numerous changes in reaction conditions, reactants and the like can be made without departing from the inventive concept. The invention is best defined in its metes and bounds by the claims which follow.

We claim:

1. A cured nitroso rubber consisting essentially of a cured terpolymer consisting essentially of a mixture of three fluorinated monomers, one of said three fluorinated monomers being a 4-substituted-2,3,5,6-tetrafluoronitrosobenzene monomer selected from 4-bromo-2,3,5,6-tetrafluoronitrosobenzene and 4-carboxy-2,3,5,6-tetrafluoronitrosobenzene.

2. A cured nitroso rubber according to claim 1 wherein said one monomer is 4-bromo-2,3,5,6-tetrafluoronitrosobenzene.

3. A cured nitroso rubber according to claim 1 wherein said one monomer is 4-carboxy-2,3,5,6-tetrafluoronitrosobenzene.

4. A cured nitroso rubber consisting essentially of a cured fluorinated terpolymer consisting essentially of terpolymer of a mixture of trifluoronitrosomethane and tetrafluorethylene monomers with a monomer of a 4-substituted - 2,3,5,6 - tetrafluoronitrosobenzene selected from 4-bromo-2,3,5,6-tetrafluoronitrosobenzene and 4-carboxy-2,3,5,6-tetrafluoronitrosobenzene.

5. A cured nitroso rubber according to claim 4 wherein said 4-substituted - 2,3,5,6 - tetrafluoronitrosobenzene is 4-bromo-2,3,5,6-tetrafluoronitrosobenzene.

6. A cured nitroso rubber according to claim 4 wherein said 4-substituted 2,3,5,6-tetrafluoronitrosobenzene is 4-carboxy-2,3,5,6-tetrafluoronitrosobenzene.

References Cited
UNITED STATES PATENTS

| | | | |
|---|---|---|---|
| 3,072,625 | 1/1963 | Borders | 260—92.1 |
| 3,197,451 | 7/1965 | Haszeldine et al. | 260—92.1 |
| 3,282,884 | 11/1966 | Green et al. | 260—92.1 |
| 3,310,543 | 3/1967 | Haszeldine et al. | 260—92.1 |
| 3,321,454 | 5/1967 | Crawford et al. | 260—92.1 |
| 3,399,180 | 8/1968 | Crawford | 260—92.1 |
| 3,417,068 | 12/1968 | Knoll | 260—92.1 |
| 3,427,279 | 2/1969 | Green et al. | 260—92.1 |
| 3,428,672 | 2/1969 | Castellano et al. | 260—92.1 |
| 3,472,822 | 10/1969 | Oliver et al. | 260—92.1 |

HARRY WONG, JR., Primary Examiner

U.S. Cl. X.R.

260—41, 647